United States Patent
Bui et al.

(10) Patent No.: US 7,348,803 B2
(45) Date of Patent: Mar. 25, 2008

(54) BI-DIRECTIONAL BUS BUFFER

(75) Inventors: Thi Bui, South Australia (AU);
Malcolm Kay, South Australia (AU);
David Murfett, South Australia (AU);
Mark Potter, South Australia (AU);
John Crawford, South Australia (AU)

(73) Assignee: Integrated Electronic Solutions Pty. Ltd., South Australia (AU)

( * ) Notice: Subject to any disclaimer, the term of this patent is extended or adjusted under 35 U.S.C. 154(b) by 75 days.

(21) Appl. No.: 11/426,188

(22) Filed: Jun. 23, 2006

(65) Prior Publication Data

US 2006/0290381 A1    Dec. 28, 2006

(51) Int. Cl.
*H03K 19/0175* (2006.01)

(52) U.S. Cl. .......................................... 326/82; 326/89

(58) Field of Classification Search .................. 326/38, 326/26, 27, 82–89
See application file for complete search history.

(56) References Cited

U.S. PATENT DOCUMENTS

| | | | |
|---|---|---|---|
| 4,012,593 A | 3/1977 | Yamaguchi | |
| 4,726,034 A | 2/1988 | Schillhof et al. | |
| 5,214,330 A * | 5/1993 | Okazaki | 326/90 |
| 5,428,800 A * | 6/1995 | Hsieh et al. | 326/82 |
| 5,656,950 A * | 8/1997 | Duong et al. | 326/41 |
| 5,689,196 A | 11/1997 | Schutte | |
| 5,790,526 A | 8/1998 | Kniess et al. | |
| 6,014,040 A | 1/2000 | Tracy | |
| 6,650,174 B2 | 11/2003 | Bell | |
| 6,690,195 B1 * | 2/2004 | Ngai et al. | 326/41 |
| 6,714,051 B2 | 3/2004 | Takiba et al. | |
| 6,834,318 B2 | 12/2004 | Hunter et al. | |
| 7,132,853 B2 * | 11/2006 | Feng et al. | 326/41 |
| 2006/0267632 A1 * | 11/2006 | Schwarz | 326/82 |

FOREIGN PATENT DOCUMENTS

EP      0 511 706 A2    11/1992

* cited by examiner

*Primary Examiner*—Don Le
(74) *Attorney, Agent, or Firm*—Akerman Senterfitt (57) ABSTRACT

A bi-directional bus buffer for applications using the I2C and SMBus, or other bus systems operating on similar principles, able to extend the bus load limit by buffering both the SCL and SDA (clock and data) lines, allowing capacitive loads of up to the limit of 400 pF on both sides of the buffer. With the use of an enable function, sections of the bus can be isolated, and then, thorough the use of a number of these buffers, different parts of the system are able to be isolated, and brought on-line successively or in a controlled manner, permitting a controlled start-up, and operation at maximum performance speeds while still having a diverse range of components, operating speeds and loads.

22 Claims, 10 Drawing Sheets

BI-DIRECTIONAL BUS BUFFER

TECHNICAL FIELD

The invention relates to a buffer for a bi-directional signal transmission system by which a digital signal can be transmitted in both directions.

BACKGROUND ART

An extensively used bi-directional signal transmission system is the Inter Integrated Circuit Bus system (I2C Bus system), disclosed in the Philips Data Handbook IC12a, 1989, and "The I2C Bus and how to use it (including specifications)" 1995 Philips Semiconductors.

The I2C Bus system, is a serial bus system for communication of data between individual integrated circuits, or stations, that are interconnected through a bi-directional two wire transmission channel. Of the two wires, one carries a clock signal, and the other the data, with a predetermined communication protocol. Depending on the particular function within the system, an individual station can act as a transmitter, or as a receiver.

The I2C Bus was developed to allow communication of data between integrated circuits on a single assembled printed circuit board in a manner which does not require either a wide communication bus or individual address lines between ICs (integrated circuits) in order to achieve that communication. For example, in the absence of such a bus in a digital voltmeter, the communication between the parts of the circuit performing range switching, the measuring circuit, the controller, the measurement memory, and the display drive can be designed with multiple wire parallel buses between each integrated circuit used to construct the meter. This presents a challenge to design an efficient printed circuit layout with so many interconnections on the circuit board. Much of the complexity is because it requires parallel bus pins on each IC to accommodate all of these interconnections.

In the digital voltmeter example, and in many other devices, the communication between each block in the circuit does not need high speed communication in real time, and the two wire I2C bus offers an opportunity of providing all of the data communication with only the two bus Wires which make up the common bus connected to each I2C enabled IC in turn in the system.

The advantages offered by the I2C Bus were evident from its inception. However, the specification is somewhat limiting. There have been numerous efforts to expand its application. The most important limitation which has been sought to be overcome is the distance over which the bus can operate. For use between different printed circuit boards, or between adjacent racks of equipment, between rooms, or between separate buildings it becomes impossible to continue to comply with the I2C bus rules for maximum capacitance on the communication lines. Designers also wanted to be able to connect greater numbers of I2C Bus ICs than were permitted by the I2C Bus Design Rules. A further problem was found where I2C devices needed to communicate but were operating from different power supply voltages.

There are also other bus communication interfaces in which problems are overcome by having the forward signal path split from the reverse signal (avoiding the design difficulties inherent in a single bus path being used for bi-directional communication, and offering the possibility of opto-isolation, or complementary pair transmission protocols and other circuits to overcome common mode interference) that were not able to be used or interfaced with I2C or other bi-directional systems.

In the I2C Bus system the two wires are the data wire (SDA) and the clock wire (SCL). In operation both are connected to a positive supply ($V_{CC}$) through pull-up resistors. When the stations are not communicating the clock and data lines are free, and pulled high by these resistors. Each station which can communicate on the bus has an open collector or open drain output which can pull down the bus lines to a voltage level close to the negative supply ($V_{EE}$).

The I2C Bus protocol has been defined so that two or more ICs may start to transmit at the same time, with all ICs connected to the bus monitoring the bus line voltage, including the two or more which have started transmitting. As soon as one of those transmitting ICs detects that the bus has remained LOW even when that IC is attempting to transmit a HIGH signal, then that IC will immediately stop transmitting. That is when it detects the LOW being transmitted by another IC, when it was attempting to send a HIGH it stops transmitting and waits to retry at a later opportunity when hopefully there will be no contention.

The distance over which the bus can communicate, and the number of stations allowed is determined by the load presented on the bus line by its total capacitive load. That is by the total of the capacitance of the bus wiring, the connections, the IC pins, and the capacitive load of the input/output circuit of each IC, if the bus capacitance is increased then the maximum possible speed of the bus is limited, and the slower rise and fall times on the bus start to cause difficulties.

A number of design suggestions have been made to overcome these problems of expanding and extending the application of the I2C Bus. Many simple circuits have been published seeking to provide this expanded capability. Most of these circuits have problems which may be associated with latching, be only conditionally stable, or present glitches, and not be able to reverse their direction of signal flow when active. For example a circuit will latch if when the receiving logic path goes low, and when it transfers this input low to its output, the output in turn is detected as being low, and this low signal is returned to the input as a low signal, holding the original input low, even when the original external low drive signal is removed. Thus the bus has 'latched' into this low state.

Many circuits have been suggested that fail to buffer the signals properly. If one side is held low, and while still low its output is held low, and then the original input drive is released, the application of the low on the output side should continue to hold the input bus low. Unfortunately many proposed circuits fall this test, and the input goes high for the time needed for the buffer circuit to recognise that the signal path has reversed, generating a short pulse or glitch on the input. Let us call this the glitch test.

The problem arises during the sort of pulse sequence which might occur during bus arbitration. In this test when the input to the bus is pulled LOW, the output side of the buffer circuit follows and goes LOW. If the output is then held LOW by another IC pulling it LOW on the output side (noting that it is already LOW at that time, being held LOW by the original input signal being LOW and acting via the forward path through the buffer) then that output will be held LOW by both the input LOW, and the output being held LOW on that side externally. If the input LOW is then released, and we watch the voltage on the input side, observing the behaviour of the input pin voltage after it is released, we ought to observe that it remains LOW because the output is being held LOW. However in many of these buffer circuits the forward path from input to output is active (and not the reverse path) only until after the input LOW is released. To prevent latching this active path has locked out the reverse path from output back to the input side of the buffer. But when the input drive holding the input LOW is released, the input pin will initially go HIGH to turn off the forward signal path, and only after the time delay needed for this signal to propagate to the output, will the externally applied LOW on the output be able to be detected, and the reverse path from output to input enabled, finally, after a further propagation delay pulling the input pin LOW again to reflect the LOW at the output pin. This HIGH on the input pin which appears when the pin is released in this test, appears as a HIGH pulse or glitch until the LOW signal from the output is propagated back to the input and able to pull it low. This glitch can present a HIGH signal to the ICs on the bus at a time when the bus should be held LOW without a glitch.

A buffer circuit has been described in U.S. Pat. No. 5,790,526, Bi-Directional Signal Transmission System and Adapter for such a system. In this patent an I2C Bus buffer is described in which the input and output are connected through a low impedance resistor, and the voltage generated by the current flowing in this resistor is used to boost the pull-down capability on the bus. An integrated circuit based on this invention is the P82B715 Bus Buffer, distributed by Philips. This IC provides a boosted bus drive on the bus output, offering an increase in pull down drive capability of 10 times the normal I2C Bus pull down capability. This increased pull-down capability is equivalent to a lowering of the bus impedance, and therefore an ability to drive a 10 times increased capacitive load. This device passes the glitch test and offers an expansion capability by allowing a load to be driven which presents an increased capacitance on the buffered bus side. It does not allow interfacing of stations with different supply voltages. However the P82B715 also has a fairly large power supply current demand of 15 mA typical, making it difficult to use in applications where the available power supply current is limited.

Another circuit is described in U.S. Pat. No. 6,014,040, Bi-Directional Signal Transmission System. In this circuit, which has been realised in the integrated circuit P82B96, distributed by Philips, the loop between the forward and the reverse buffered signal has been broken by adopting two voltage levels on the input side, the lower of which corresponds to the input being held low, and therefore activating the forward signal path, and a slightly higher voltage (still able to be interpreted by ICs (stations) connected on the input side as a bus low signal) which is the low output of the reverse path, but is not sufficiently low to activate the forward path input comparator. The P82B96 offers split input and output on the output bus side so that it can be interfaced to other ICs in which the transmit and receive path are separate. If this capability is not needed then the bus out, and bus receive pins may be Wired together to give a single output buffer.

The first example of these two buffers offers only forward current gain, and no voltage gain. Therefore it is stable, and does not latch or oscillate. The P82B96 breaks the loop of the forward and reverse paths by using a lower input voltage threshold in the forward path avoiding latching and instability. It also has the backward signal path active when the input is held low, and therefore does not generate a glitch it the low is switched from input to output while active low. As the two voltage thresholds are set internally in the integrated circuit, and are chosen to be consistent with the thresholds defined in the I2C standards when run from a 5 volt supply, difficulties have arisen since it was first designed as the power supply voltages for ICs have been reduced to take advantage of lower power and higher speeds. While the P82B96 has been designed to operate with a supply of less than 2 volts, the voltage of 0.8 volts which corresponds to a low being received on the bus output (that is when the low on the output pin means that the reverse path is active, and is setting the input voltage to low) can be too high to interface with ICs designed for such low supply voltages. This voltage may be higher than the low threshold that is detected by a low voltage I2C device which is connected to the input bus. In this way there are design problems in using the P82B96 at low voltages because these input threshold voltages are fixed internally.

However one advantage of the P82B96 derives from it offering true buffering between the input and the output side. Thus circuitry connected to the output does not add any more to the capacitive load on the input I2C Bus. In addition the output is capable of higher current drive than allowed by the I2C standard (the limit on the input side), and further P82B96 devices can be connected elsewhere on the output bus, to offer other I2C compatible parts of the network on their inputs. Thus the P82B96 can permit buffers to be connected in series, expanding and extending the network beyond the maximum capacitive load limit that would make it unworkable if no buffer is used.

Other advantages of the P82B96 include the ability of the output being split into transmit and receive paths thus allowing opto-couplers to electrically isolate two sides of the bus. With such isolation power supplies can be used which reference different ground (common) systems on each side of the opto-isolation. With external circuitry, the Vcc supply can be switched off, allowing both the input and output buses to operate without interconnection and interaction. This can be important in cases where part of the bus may be driven from a power supply which can be switched off, or becomes isolated under fault conditions. In most ICs the bus is shorted when the power supply fails.

Another bus buffer is the Linear Technology Hot Swappable 2-Wire Bus buffer, the LTC4300-1 and LTC4300-2. These buffers allow Input/Output card insertion into a live backplane without corruption of the clock and data busses. It employs rise-time accelerator circuitry that is described in U.S. Pat. No. 6,650,174, and uses this facility to allow the use of weaker DC pull-up currents while still meeting the rise-time specifications of the I2C standard. Weaker pull up currents which are achieved by increasing the resistance of the pull-up resistors on the bus, offer a saving in DC power supply current and enable operation at lower pull down currents. However this has moved away from the common standard of the I2C range of devices which all have a standard pull-down capability of 3 mA.

The LTC4300-1 and LTC4300-2 have a maximum voltage drop of 0.4 volts between input and output when sinking 3 mA, This prevents two such devices operating in series if they are being used with 3 mA pull-down current.

Objects and advantages of the present invention will become apparent from the following description, taken in connection with the accompanying drawings, wherein, by way of illustration and example, an embodiment of the present invention is disclosed

SUMMARY OF THE INVENTION

In one form of this invention there is proposed a bus buffer including circuitry adapted to generate a logic high level on a first bi-directional signal path, one or more first stations connected to the first bi-directional signal path adapted to monitor a logic level on said first path, and to generate a logic low level on said first path;

an interface device operatively coupled to the first bi-directional signal path, said interface device having a first receive input and a first transmit output; and circuitry adapted to generate a logic high level on a second bi-directional signal path; and one or more second stations connected to the second bi-directional signal path and adapted to monitor the logic level on said second path, and to generate a logic low level on said second path;

the second bi-directional signal path being operatively connected to a second receive input and a second transmit output of the interface device, the interface device further including first means adapted to ensure that an output voltage on the second signal path follows an input voltage on the first signal path, interposing an offset voltage between said input and output voltages such that the voltage on the second signal path exceeds the voltage on the first signal path by the magnitude of said offset voltage; and second means adapted to ensure that an input voltage on the second signal path follows an output voltage on the first signal path, interposing an offset voltage between said input and output voltages such that the voltage on the first signal path exceeds the voltage on the second signal path by the magnitude of said offset voltage; and the first and second means further adapted such that when both the first and second signal paths are at an equal voltage, the interface device does not act to drive the first or the second signal path.

A logic LOW generated by a station on the first signal path will be transmitted by the interface device to the second signal path with an offset voltage sufficiently small for the voltage on the second signal path to be detected as a logic LOW by the stations monitoring the voltage level on that second signal path; and similarly a logic LOW applied by a station on the second signal path will be detected as a logic LOW signal by the stations connected to the first signal path.

In preference the buffer is implemented using a bipolar process.

In preference the buffer is adapted to operate at a speed capable of meeting the I2C specification.

In preference when both the first and second signal paths are at an equal voltage, the drive by the interface device is non-zero, but is less that required to change the logic level of either signal path.

A characteristic of its operation is that while in the active buffer state, while the output of the buffer is following the input signal, the margin, or offset voltage between the input and output should not be so large as to prevent the use of buffers in series. As will be evident in the application circuits described herein, series operation can offer important advantages in many applications. Similarly, this invention avoids the problems arising from the fixed voltage thresholds that were used in the P82B96 described above. The use of the dual input thresholds also prevent series operation, and more than one P82B96 being connected on the input side.

In preference the offset voltage is 0.1 volts.

In preference, the offset voltage is user definable.

A further feature of this invention, is that buffer action is only invoked when the input side bus has been pulled down to an operational threshold voltage (chosen, as 30% of $V_{CC}$, but not restricted to this value). Once the falling input reaches this threshold, the buffer action is enabled, and the output voltage then follows the input with a small offset. This can be further enhanced by adding a boost pull-down circuit that adds to the pull down current on the output bus for the time that the input voltage is below this threshold and the output voltage is still above it.

In preference the buffer is adapted to include an operating threshold voltage.

In preference the operating threshold voltage is 30% of $V_{CC}$.

In preference the operating threshold voltage is user definable.

In preference the operating threshold voltage on one side may be different from that on the other side.

A feature of this invention is to have a controlled offset voltage, or margin between the input voltage on one side of the buffer, and the output on the other side which, while following the input voltage, is at a higher voltage by a sufficient margin to ensure stable operation of the buffer, and yet not so high as to prevent series operation, or to compromise threshold levels in the integrated circuits connected to the side operating as the output.

When the buffer is not enabled, a feature of the design is to ensure that there is minimal loading of the bus. In particular any capacitive loading must be minimised so as to not limit the load capability and performance of the other bus ICs working on each side of the disabled buffer. A second important feature of the disabled buffer is that its power supply current requirement needs to be significantly reduced to a minimal value. That is to a current which is only sufficient to hold the IC ready to be enabled when needed.

In preference the buffer includes means to enable or disable the buffer such that when in the disabled state the buffer presents a low capacitance load on the busses on both sides of the buffer.

In preference the buffer includes a boost pull-down current sink circuit which acts to pull down the output when the input is low and below the operating threshold voltage, and the output is still greater than the operating threshold voltage.

In preference the boost pull down current is 4 mA.

In preference the input/output terminals can be pulled high to a voltage above the supply rail.

In preference the operating power supply can be between 2 volts and 5.5 volts, and the bus input/outputs can be pulled up to 15 volts.

In preference the forward and reverse paths are identical, and interchangeable.

It may be advantageous for a bi-directional buffer to function such that the forward and reverse paths are not identical, and in which input/output side of the buffer has different characteristics to the other. One with higher current capability on one side that enables that output to drive a higher capacitance bus (such as a long line).

In preference the offset voltage for the send and receive paths are dissimilar.

In preference the buffer is adapted such that the send path and receive path are physically separate.

This invention will also permit bus level translation between a wide range of bus voltages, from 1.8 volts to 15 volts. This provides enormous flexibility in interfacing systems employing different technologies.

Its design must offer a fast response time, ensuring that any glitches (like those common in other buffer designs) are kept well within the 50 ns I2C specification limit. This is achieved without "rise time accelerators" as used in some buffers. Such accelerators, combined with low noise margins, can cause significant and extended glitches well outside the I2C specification.

BRIEF DESCRIPTION OF THE DRAWINGS

The invention will be explained in further detail by way of example and explanation of some of the different possibilities in its application and its design with reference to the accompanying drawings.

BEST MODE FOR CARRYING OUT THE INVENTION

Figure 1:
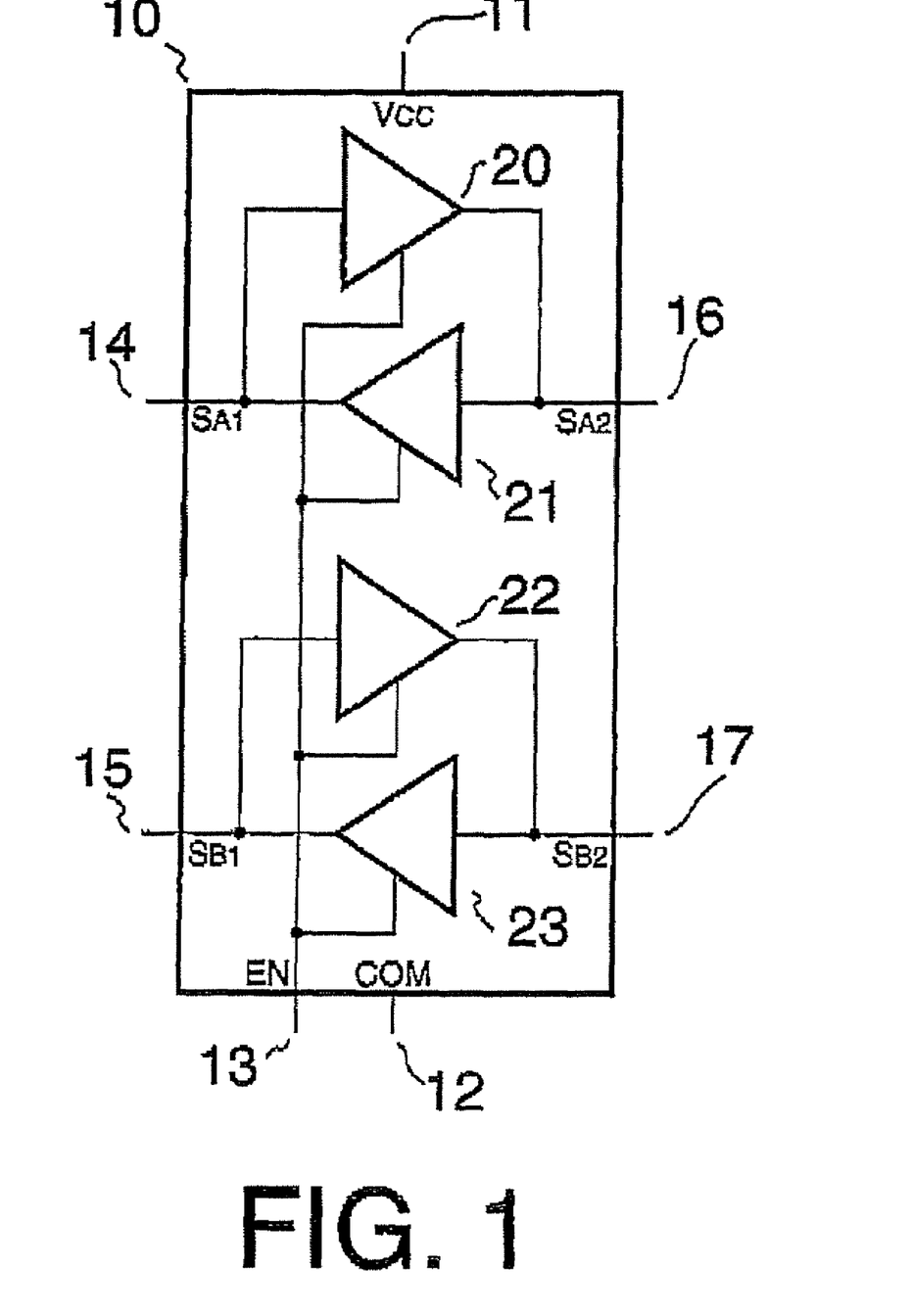
FIG. 1 shows a basic circuit diagram of a bus buffer in accordance with the invention of the buffer.

The basic structure of the buffer is shown in FIG. 1. The integrated circuit 10, has 7 connecting pins. There is the positive supply 11 ($V_{CC}$), the common negative power supply connection 12 (COM or $V_{EE}$), the enable control pin 13 (EN), and two buffer sections with input and outputs 14 (SA1) and 16 (SA2) for the first (the A buffer), and input and output 15 (SB1) and 17 (SB2) for the second buffer in the IC (the B buffer).

In the buffer the forward path amplifier 20 (22 in the second buffer path) is a follower amplifier, the output of which follows its input voltage. As can be seen, a second buffer amplifier 21 (23) completes the backward or reverse path, providing the bi-directional capability that is part of the required function.

As the two buffers in this example are symmetrical, the input and output can be interchanged without making any difference in function and performance, although there may be good reasons to design a similar buffer with non-symmetrical characteristics (such as the output side having a greater current drive capability). For convenience the inputs have been called side 1 (SA1 and SB1) and the outputs side 2 (SA2 and SB2) of each of the buffers As the integrated circuit contains two identical buffers, one for the bus clock drive SCL, and one for the bus data drive SDA, for convenience in the following discussion only one buffer is described and shown in the figures, and as the second buffer is the same as the first buffer, further explanation is not needed.

Figure 2:
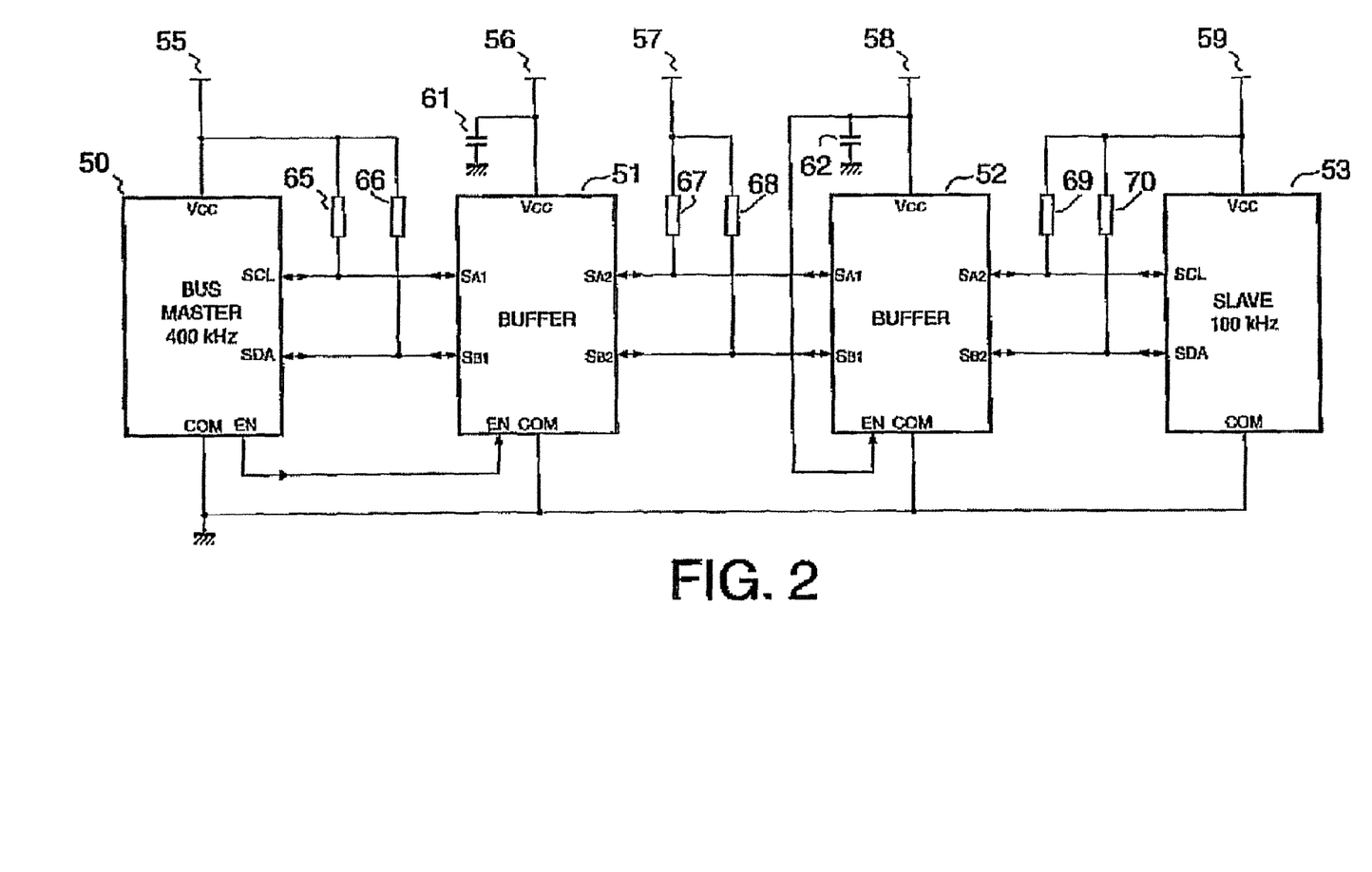
FIG. 2 shows an embodiment of the invention in which I2C circuits operating on different supply voltages and at different speeds can be interfaced.

FIG. 2 shows a typical application for the buffer IC demonstrating the use of this buffer with various supply voltages, and employing it to interface and enable communication between controllers in those different parts of the equipment.

The bus master 50 is a controller IC capable of driving the data (SDA) and clock (SOL) buses at the high speed rate of 400 kHz. In this example two buffers are used, the first 51 is used to convert to a higher bus voltage to transmit over a significant distance, with the second 52 has its enable control connected to its supply voltage (always enabled) and is used to drive a low voltage low speed 100 kHz slave 53.

The bus master 50 is a low voltage device running from a 1.8 volt supply 55. From this supply the SCL and SDA I2C bus lines are pulled high to $V_{CC}$ with 600 ohm resistors, 65 and 66 respectively, thereby providing the 3 mA pull down current required to meet the I2C specification. An output of the bus master IC is also used to drive the enable pin EN of the buffer 51. The buffer is enabled when this drive pin is high. A feature of this circuit is that the load it is driving is a low speed slave IC 53, and it cannot be driven at the 400 kHz frequency possible for communicating with a high speed I2C load. If there are other high speed ICs connected to the SCL and SDA outputs of the bus master 50, a low voltage on the enable pin to this first buffer 51, isolates the low speed part of the circuit, allowing the bus master to drive those other ICs (not shown) at their full speed capability.

The capacitors 61 and 62 provide transient bypassing of the power supply rails close each of the buffers, and are 0.01 microfarads. The supply voltage 56 of the first buffer 61 is 3.3 volts. The pull-up resistors 67 and 68 of 3900 ohms from the SA2 and SB2 outputs of this buffer which drive the SA1 and SB1 inputs of the following buffer are connected to a power supply of 15 volts 57. Thus the buffer must be capable of pulling low a current of 15/3900=0.0038 A, or 3.8 mA, which is within its specified design pull-down capability of 4 mA. In this case a high voltage has been used to improve the noise margin, and also to more closely approximate a current source load, accelerating the pull-up time. Thus the bus length between the two buffers can be run over a greater distance than would otherwise be possible.

Figure 3:
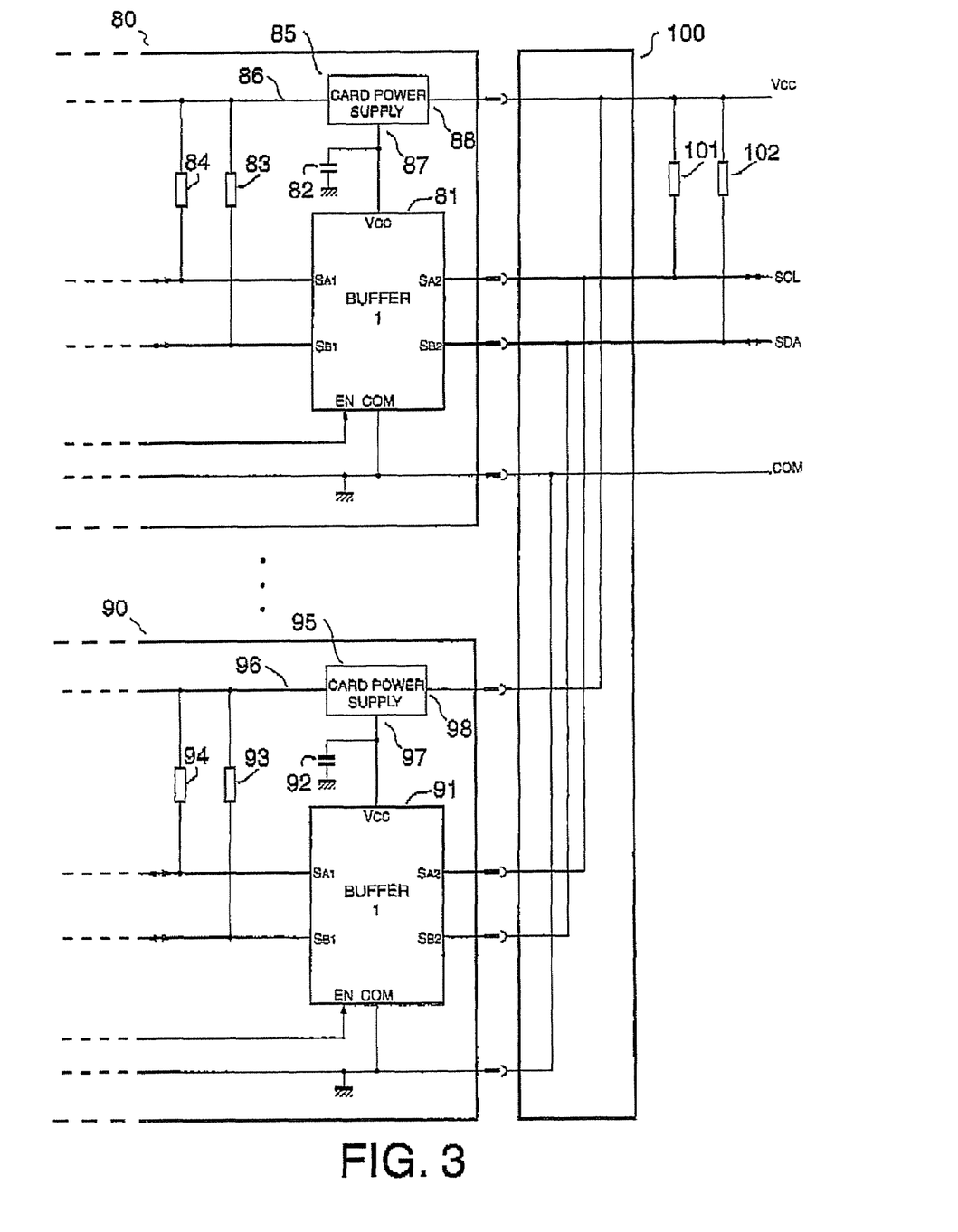
FIG. 3 shows an embodiment of the invention in which the buffer is used in a backplane application.

Then, the second buffer, 52, running from a 5.5 volt supply voltage 58, with its enable pin connected to this supply, provides an output which is used to drive the slave device 53. The slave device power supply voltage 59 is 3.3 volts, and the pull-up resistors 69 and 70 from the buffer driving it are 1,100 ohms. This requires a pull-down capability of 3.3/1100=0.003 A or 3 mA, the design pull-down capability of the I2C bus specification, FIG. 3 shows an application where circuit cards are connected together on a backplane 100. This backplane has power supplies, and an SDA and SCL connection with pull-up resistors 101, and 102 to any other I2C devices interfaced to it. Two cards 80 and 90 are shown plugged into the backplane, although of course the backplane can provide sockets for a large number of cards, as has been suggested in the figure.

Peripheral cards operating at a number of voltages can easily be interfaced with the backplane using the buffer and a minimum number of other components. For example the card 80 can have circuitry running from a power supply voltage 86 of 1.8 volts. Card 90 can use a supply voltage for the ICs on the card of 3 volts, while the backplane supply voltage is 5.0 volts. Each card can be safely isolated from the system by using the enable inputs to the buffers 81 and 91. Control of the enable operation can be performed by watchdog circuits on the peripheral card, enabling the card to be safely plugged into the backplane before the interface is enabled. The power-on enable delay may be provided by something as simple as an RC circuit. Another idea which can be used would employ the provision in the latest telecommunications standard which provides for a micro-switch power enable on the locking handle. An un-powered card provided with this buffer can be safely plugged into the active backplane, then powered up without causing disruption to the system bus.

In FIG. 3, cards 80 and 90 each have power supply circuits 88 and 98 which provide a 3.3 volt supply 87 and 97 for the buffers 81 and 91 respectively. These supplies are bypassed with filter capacitors 82 and 92.

The output voltage 86 of the power supply on card 80 is 3.3 volts, with SCL and SDA pull-up resistors 83 and 84 of 1.1 kilohms. On the other card 90, output voltage 96 of the power supply is 1.8 volts, with SCL and SDA pull-up resistors 93 and 94 of 600 Ohms.

This circuit illustrates the flexibility with which different circuit requirements can be interfaced easily using this buffer.

Figure 4:
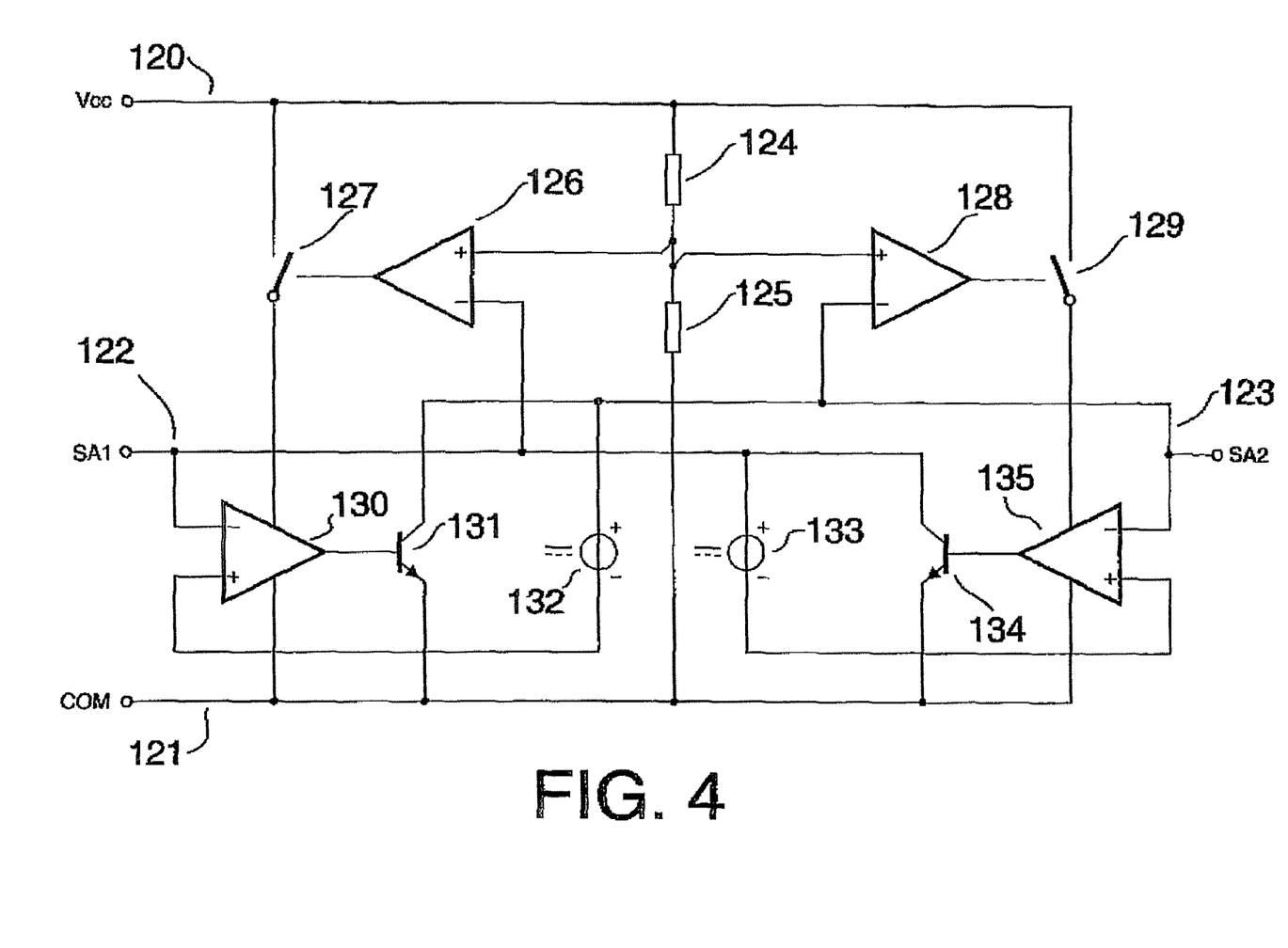
FIG. 4 shows a more detailed block diagram of an embodiment of the invention in which comparators monitor the bus voltage on each side of the buffer, and activate the follower circuit when either side is pulled down below the operating threshold.

FIG. 4 shows in more detail the basic structure of this invention. The supply rails are the positive supply Vcc 120 and negative, common, COM 121. The SA1 input is on one side of the buffer 122, with SA2 on the other side 123. Being a symmetrical circuit the input and output are interchangeable conceptually, although for the sake of explaining its operation it is simplest to define the input and output sides.

The first buffer amplifier 130 has the input voltage connected to its negative input. This signal is inverted by the transistor 131 driven by the amplifier output, this inversion reversing the input sense to make the output on the collector of transistor 131 a voltage follower, which, because of the 100% negative feedback to the plus (+) input of the amplifier 130, has unity voltage gain. This collector of transistor 131 is connected to the buffer output SA2 123. An offset voltage 132 is included in the negative feedback path ensuring that when the input SA1 122 is pulled low, the output SA 123 will follow the input voltage with a voltage offset of typically +100 millivolts.

An identical amplifier made up of voltage offset 133, transistor 134, and amplifier 135 is connected in the reverse direction with SA2 123 as its input, and SA1 122 as its output. If SA2 is pulled low, then this amplifier acts to ensure that SA1 122 follows about 100 millivolts above the voltage on SA2 123. Because SA2 123 is negative with respect to SA1 122, the forward amplifier path 130, 131 and 132 having its output at a voltage more negative than its input, is cut off and not in its active range. Therefore, by having the controlled offset, or margin voltage between the input and the output, the buffer is only active while driving in one direction, having the reverse path cut off. Also if the input and output voltages had a zero difference, that is the same voltage on both sides of the buffer, both paths are outside their active range and are cut off. In this way it will neither latch nor oscillate, a form of behaviour common to many suggested buffer circuits.

The other part of the proposed buffer shown in this circuit is the use of an operating threshold voltage. This is shown by the comparator 126 monitoring the SA1 122 side of the buffer, and comparator 128 as monitor of the SA2 123, side of the buffer. These buffers have an input reference voltage generated by the resistive voltage divider across the supply Vcc 120 to COM 121 made up of resistors 124 and 125. The divider ratio set by these resistors is typically set to give a threshold voltage of about 30% of the supply voltage.

Whenever either SA1 122, or SA2 123, or both, are pulled low below the threshold, the comparator controlling the power supply to the respective buffer amplifier applies power to that buffer when its related input reaches that operating threshold voltage. As will be seen in the more detailed circuits in the following figures, further control options are able to further enhance the performance of the buffer.

Figure 5:
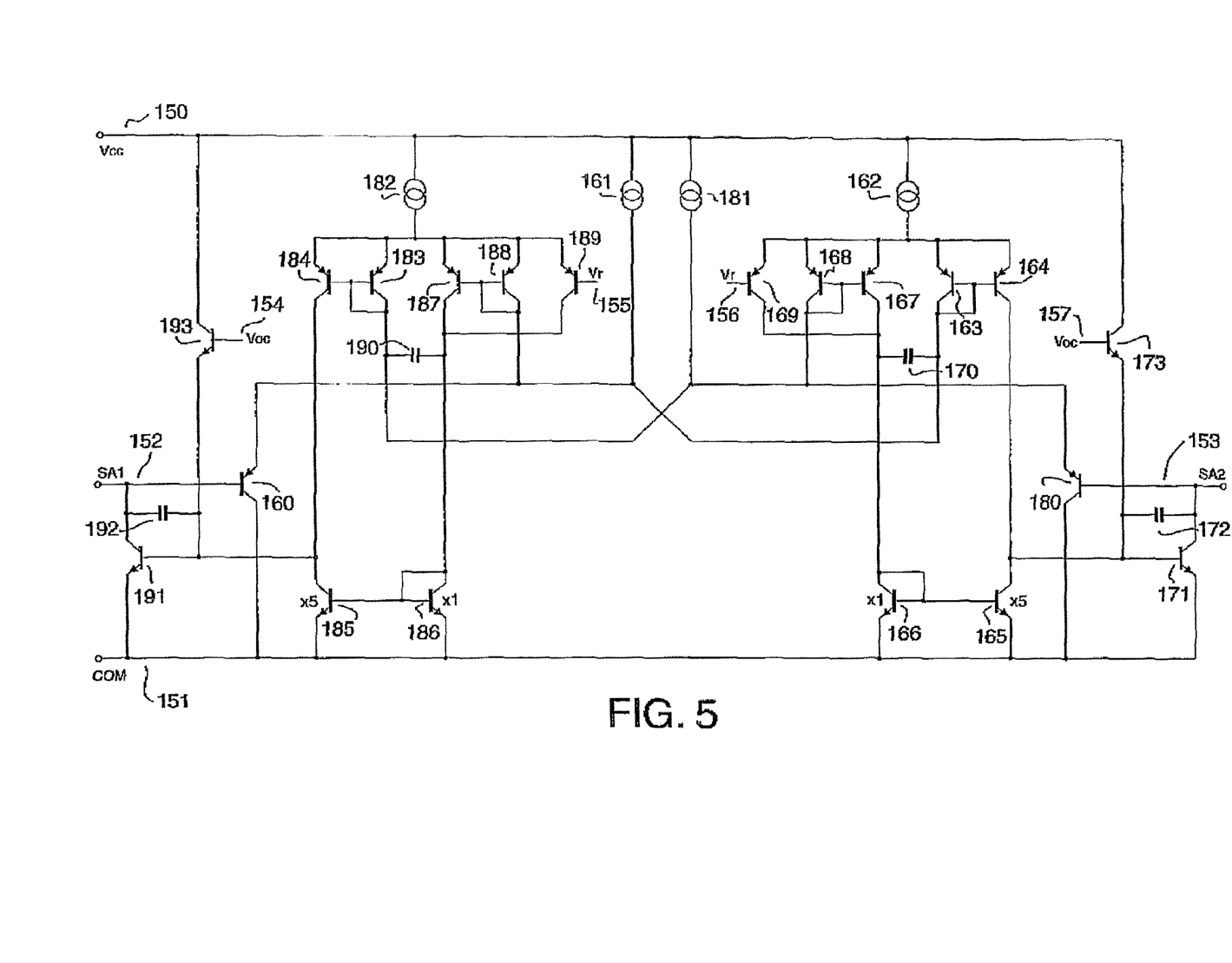
FIG. 5 shows a circuit embodying the invention which provides the desired buffer action, showing both the forward and reverse signal path for a single line buffer.
Figure 6:
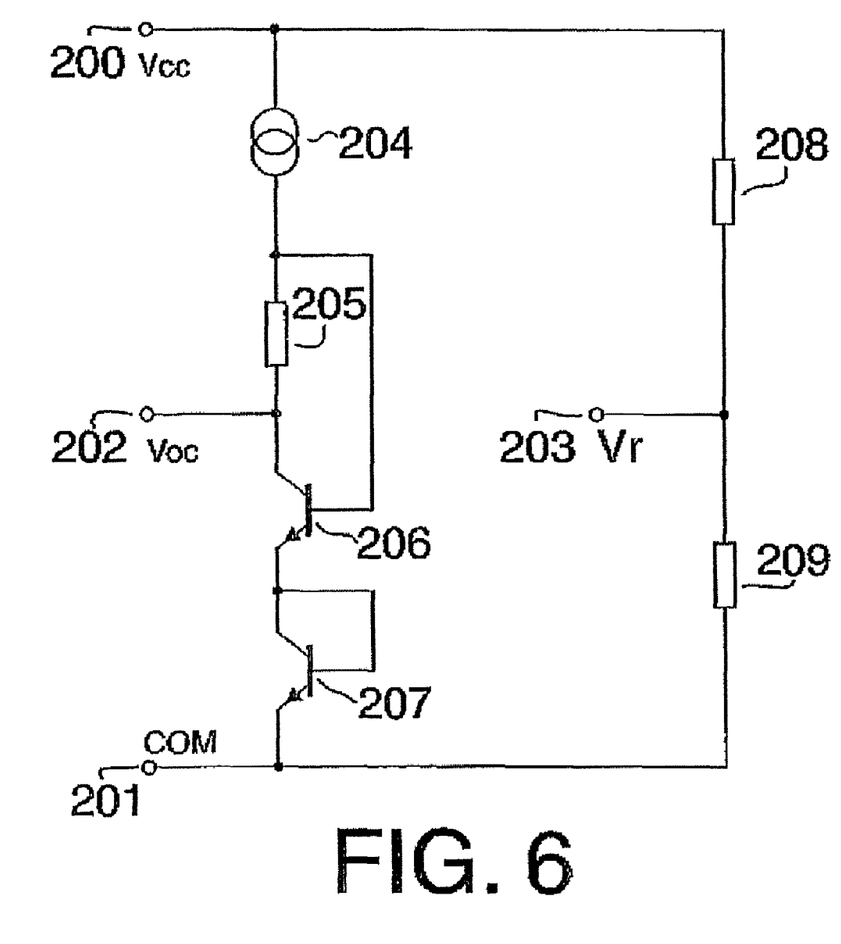
FIG. 6 shows a circuit embodying one way of generating the reference voltage used in the embodiment of FIG. 5.

FIG. 5 shows a feasible circuit embodying this invention. It provides a buffer which meets the main design goals of this invention. It also uses simple reference voltage circuits which are shown in FIG. 6. Both the forward and the reverse paths are shown, illustrating the inter-relationship between the two amplifier paths.

The supply rails are Vcc 150 and COM 151. Following the forward signal path from SA1 152 to SA2 153, the SA1 input 152 voltage is applied to the base of emitter follower PNP transistor 160. Its emitter is pulled positive by a current source 161 of typically 200 microamps. Excess current over that provided by this current source is applied to the diode connected transistor 163 (and/or transistor 188) which is part of the current mirror made up of PNP transistors 163 and 164. The collector current of transistor 164 drives the base of output transistor 171, turning on this transistor to pull down the output SA2 153.

When SA2 153 is pulled down the emitter follower of transistor 180 (also pulled high by a current source 181, typically 200 microamps) and current in the diode connected transistor 168 is mirrored in the collector current of transistor 167. This collector current is further mirrored by the NPN transistor pair of transistors 166 and 165. If sufficient current flows, the collector current of transistor 165 serves to cut off the current drive to the base of the output transistor 171 to prevent it pulling the output down any further, The emitters of the two current mirrors made up of transistors 163 and 164, and mirror pair transistors 167 and 168, and threshold detector transistor 169, are supplied with a further current source 162 of typically 200 microamps.

An important feature of this circuit is the imbalance of the NPN current mirror 166 and 165 acting to turn off the output transistor 171. In this mirror the output transistor 165 has an emitter area 5 time larger than the area of the diode connected NPN transistor 166. This makes the turn off current 5 times larger than at would otherwise be, in an amplifier which otherwise uses symmetrical equal ratio mirror circuits. This offsets the balance point at which the turn-on current is equal to the turn-off current at the base of output transistor 171.

Therefore in this circuit, when SA1 152 is pulled low, then the circuit acts to pull the output SA2 low, it reaches balance and equilibrium before SA2 153 is pulled down to the same voltage as SA1 152 because of this offset in the balance point resulting from the emitter ratio of transistors 166 and 165. Thus there is an offset voltage, or differential across the buffer, which is created inherently by this design feature.

Finally in the operation of the forward path in this circuit there are the actions of the two reference voltages generated by the circuit shown in FIG. 6. The output catcher reference Voc 202 is generated as follows. The Vcc 200 and COM 201 supply give a current source 204 from Vcc. This drives two diode connected series NPN transistors 206 and 207. The voltage drop across two diodes is a little greater than the required voltage, and a resistor 205 in the collector current path of the upper transistor 206, gives a voltage drop to a voltage a few tens of millivolts below the two times VBE of two series silicon diodes 206 and 207.

The second part of this circuit generates the reference voltage Vr 203. This is simply a voltage divider across the supply using resistors 208 and 209.

The output catcher reference Voc is applied to the base of transistor 173. This voltage, which is a few tens of millivolts less than twice VBE, prevents the base voltage of the output transistor from being pulled low by more than a few tens of millivolts below its threshold voltage. This enhances the response speed, and addresses transient response problems, as it prevents the base of output transistor 171 from being pulled low, deep into cutoff. Also the capacitors 172 connected between the collector and base of the output transistor 171, and capacitor 170 connected from diode connected transistor 163, and the collector of transistor 167 stabilize the transient response of the buffer to prevent overshoot and ringing.

When both SA1 and SA2 are pulled high by their pull-up resistors externally to the buffer IC, that is when no I2C device is pulling the SCL or SDA lines low, then the pair of current mirrors made up of transistors 163 and 184, and, 167 and 168, are cut off, because of the lower voltage applied to Vr 156 on the base of transistor 169 holds the base of transistor 169 low and forces transistor 169 to conduct the lull current source 162 current to mirror transistors 166 and 165 cutting off the output transistor 171 as much as the output catcher reference Voc 157 on the base of transistor 173 will permit.

If either SA1 or SA2 are pulled low below the reference threshold voltage Vr, then either current mirror diode 163, or diode 168 respectively will conduct. If SA1 is low, current mirror 163 and 164 acts to pull down SA2, and if SA2 is low, then current mirror 168 and 167, acting through mirror 166 and 165 serves to cut off transistor 171, and not to allow it to pull down SA2 further.

Because the buffer shown in FIG. 5 is symmetrical, the reverse path circuit is identical. This is made up of additional current source 182, transistors 110, 183, 184, 185, 185, 186, 187, 188, 189, 191, and 193, and capacitors 190 and 192. Voc is used at 154, and Vr at 155.

Figure 7:
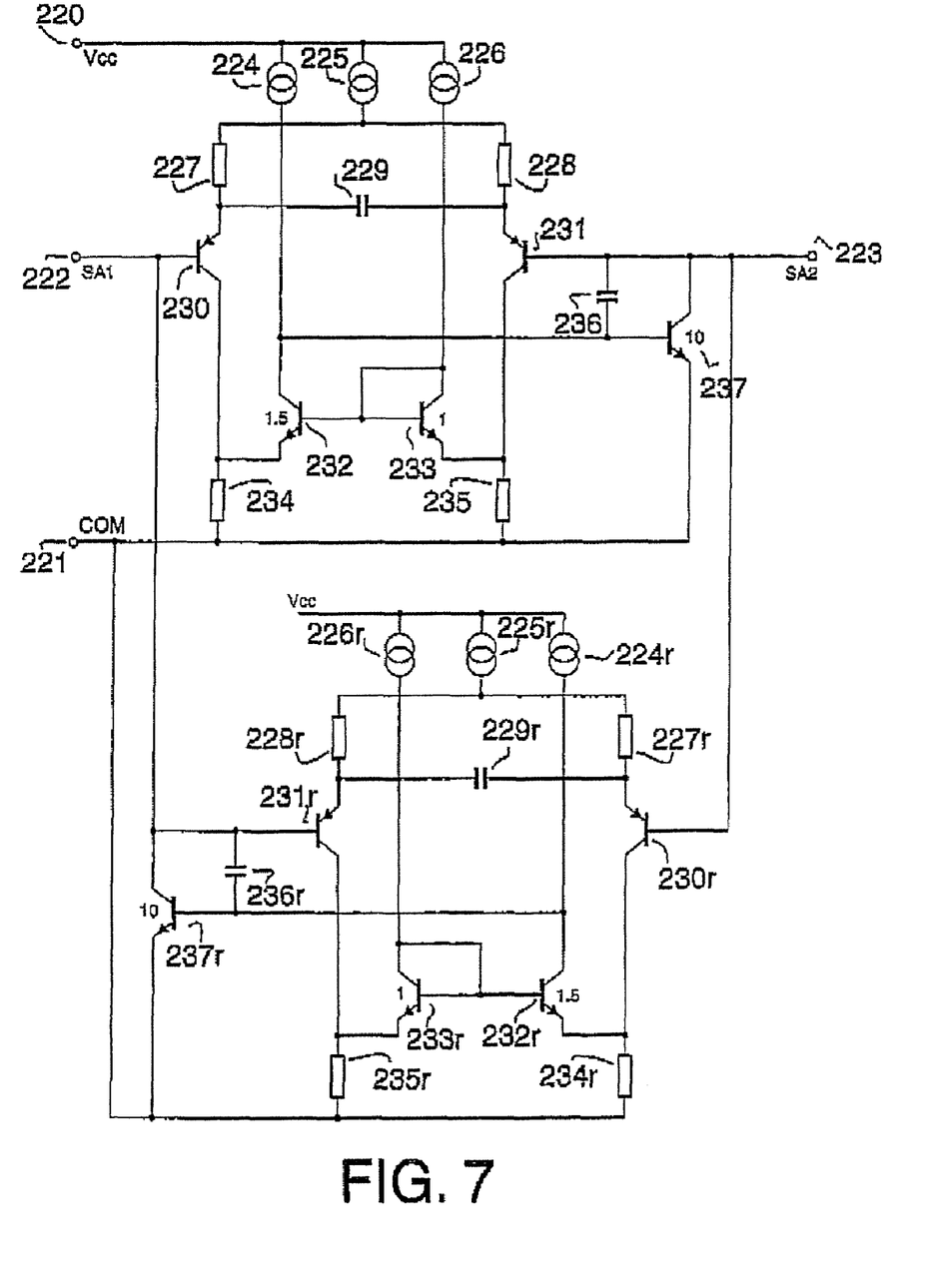
FIG. 7 shows a further example of a circuit of a bus buffer in accordance with the invention.

In this circuit the enable function can be achieved by using its input signal to switch off the current sources when the circuit is in the inactive state, FIG. 7 shows another circuit providing a realization of this invention. In FIG. 7 the basic buffer circuits of this circuit are shown, with the circuit of FIG. 8 adding the enable function, the reference voltage circuit with various control outputs used to control the function of the IC are shown in FIG. 9, and in FIG. 10, the decoding of the outputs from the threshold detector are decoded to control the buffer output and to provide a boost pull down which further enhances the performance of the buffer.

The understanding of circuit of FIG. 7 is simplified because it has independent circuits for the forward, and the reverse buffer amplifier paths. Although they are identical, both have been shown in this FIG. 7, with the components making up the reverse path similarly numbered but having a suffix r (reverse) added to emphasise the similarity. Only the forward amplifier is described.

When the SA1 input 222 is pulled low it unbalances a PNP differential pair made up of transistors 230 and 231. The emitters are powered by a current source 225 of typically 330 microamps with a series resistor 227 and 228 of typically 500 ohms driving each emitter. A capacitor 229 of 5 picofarads provides some transient coupling between the junctions of the resistor 227 and transistor emitter 230, and resistor 228 and transistor emitter 231. On the input side the collector current of transistor 230 is applied to drive resistor 234 (typical resistance 350 ohms) connected to COM 221. This is also connected to the emitter of NPN transistor 232, the collector of which is pulled up by typically 200 microamp current source 224, and is connected to drive the base of the output transistor 237 (emitter to COM) the output of which drives output SA2 223.

On the other side of the balanced amplifier made up of transistors 230 and 231, the collector current of transistor 231, the base of which is driven by SA2 223, drives resistor 235 and the emitter of diode connected transistor 233. The collector base of transistor 233 is also driven by a current source 226 of typically 220 microamps, and also drives the base of transistor 232. Thus these two transistors mirror the current source 226, and at balance, the current in the collector of 232 will be equal to, and opposed to the current source 224. The difference between these two currents is the current available to drive the base of the output transistor 237.

This mirror arrangement is upset by the difference in voltage between the input and output of the buffer, and also, in a similar manner to the circuit of FIG. 5, the areas of the transistors 232 and 233 making up the current mirrors are made unequal to provide the voltage margin, or offset difference between the input and output voltage at balance. In a typical realisation transistor 232 is 1.5 times the emitter area of transistor 233.

The output transistor 237 emitter area is also increased to provide additional drive capability. A small capacitance is also needed from collector to base on this transistor to ensure acceptable response without overshoot. Typically 0.4 pf is used, although the size of this capacitor is constrained by the limit of the capacitive load presented on the bus while operating, and also any capacitance it might present when the buffer is disabled.

Figure 8:
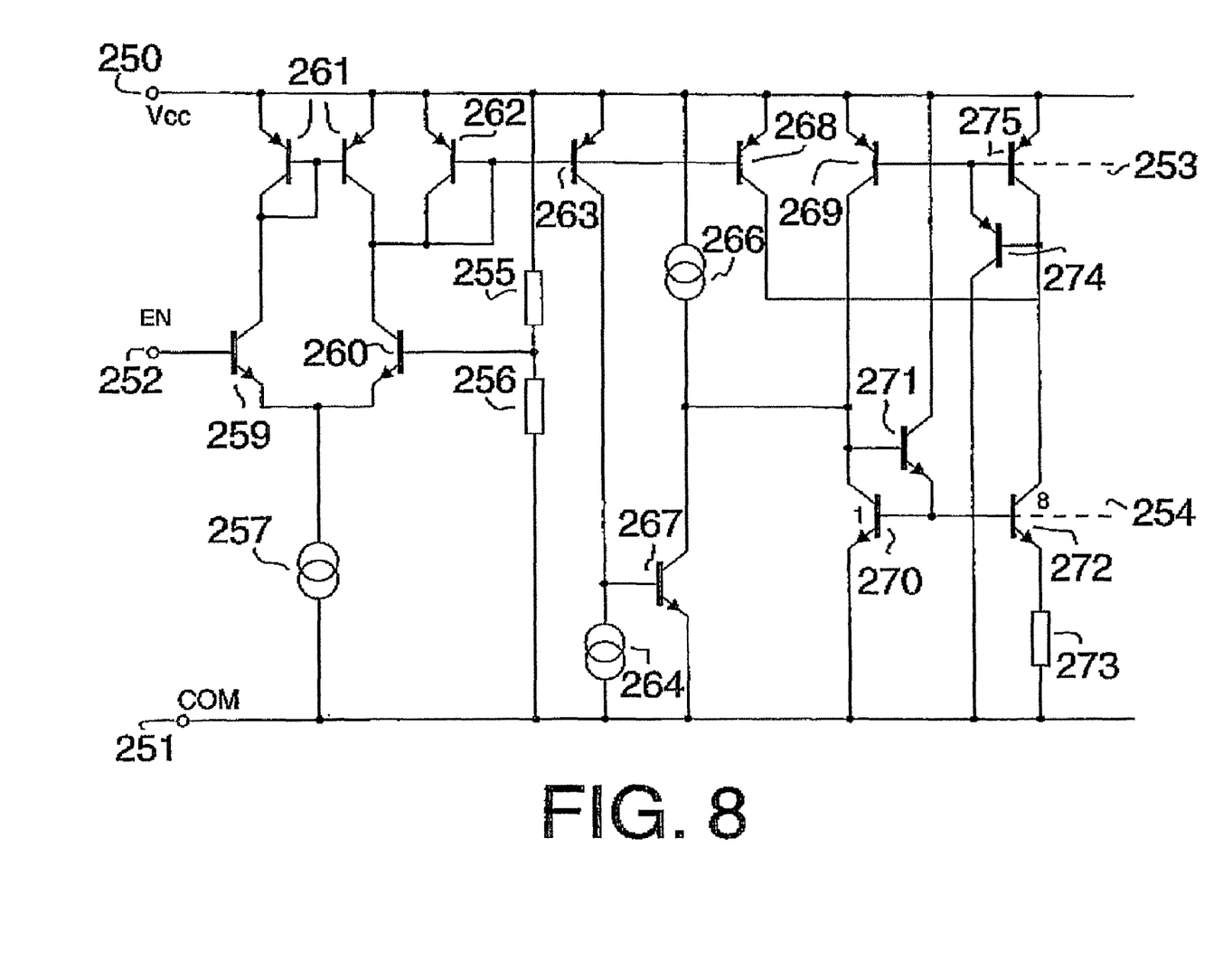
FIG. 8 shows an exemplary circuit for an enable control function.
Figure 9:
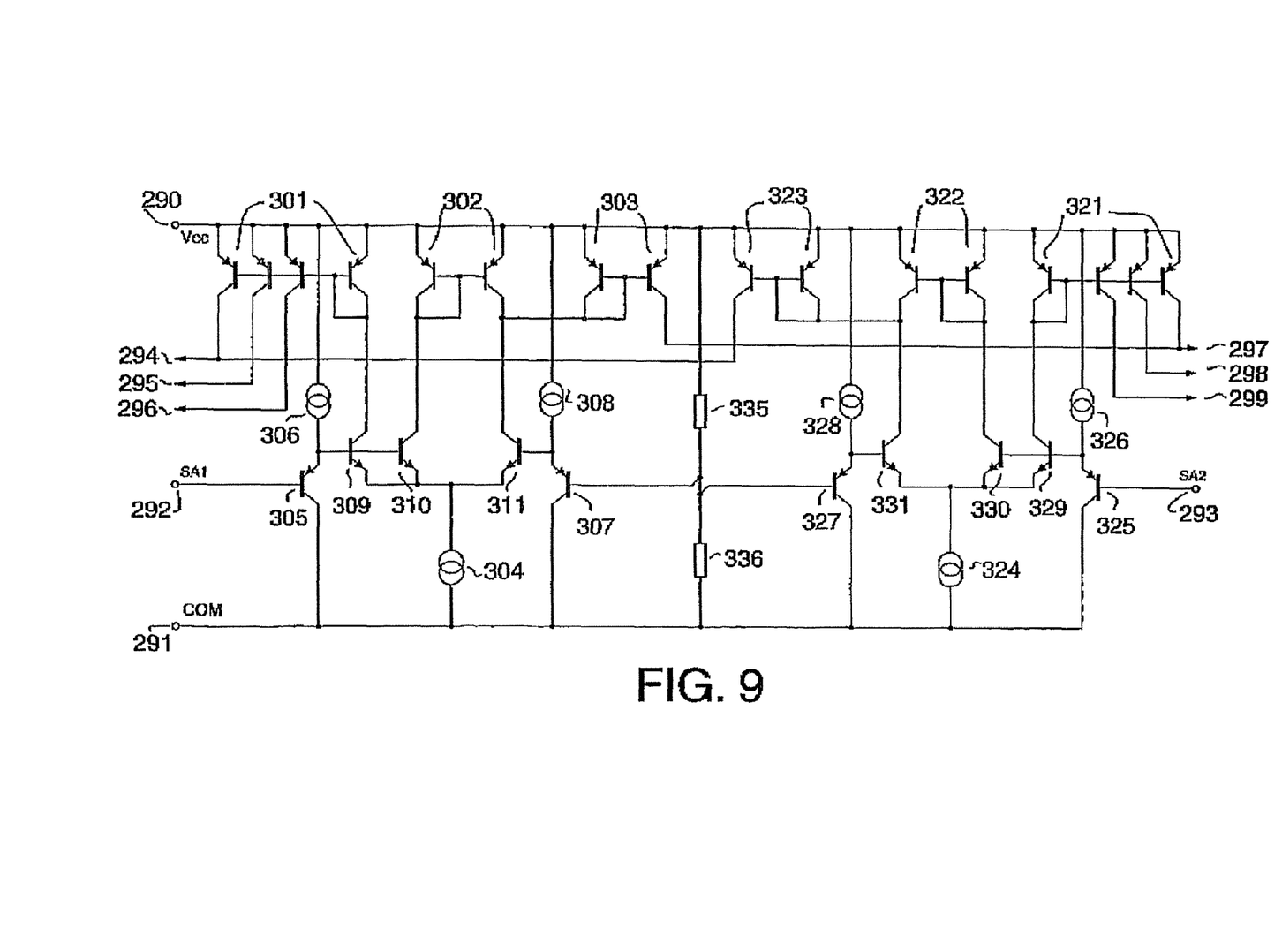
FIG. 9 shows an exemplary circuit for bus threshold voltage detection comparators employed in a bus buffer in accordance with the invention.

In FIG. 8 the enable input EN 252 is used to switch on the major current sources in the buffer IC. Some minor current sources which run whenever Vcc is present are also required to power this enable circuit in the disabled state, but the details of their circuit are not shown.

The current source 257 of typically 10 microamps provides the emitter drive to a long-tailed pair differential amplifier made up of transistors 259 and 260. The reference voltage on the base of transistor 260 is supplied by the resistor divider comprising resistor 255 to Vcc 250, and resistor 256 to COM 251. This voltage is compared to the input voltage on the EN input 252. The circuit is designed so that if EN is not connected the buffer is disabled, although it is easily revised by the addition of a small current source pulling the base of transistor 259 high for it to be to be enabled when not connected, When EN is low the collector current in transistor 259 is zero, and transistor 260 is conducts all of the emitter current source current to its collector, this current flowing into the PNP current mirror diode 262. When this collector current is applied to diode 262 it provides two mirrored current outputs from PNP transistors 263 and 268. These outputs are employed to disable the operation of the main current stabilizing loop that provides all of the operating current sources derived from the current source VBE rail 253 (for positive PNP current sources) and rail 254 for negative NPN current sources, The current loop circuit made up of transistors 269, 270, 272, and 275, with base drive transistors 271 and 274, is a well known design, in which the voltage drop across the transistor 272 emitter resistor 273 ensures regulation at a point where the voltage drop across this resistor is balanced by the VBE of NPN transistor 272 being smaller as a result of it having larger emitter area when compared to NPN transistor 270. The area ratio of eight means that at the same current the VBE of transistor 272 is about 56 millivolts less than the VBE of NPN transistor 270. As resistor 273 is 1,800 Ohms then the loop current is set by the current at which the voltage drop across resistor 273 is 56 mV: that is at 30 microamps.

This current loop is turned off by the mirrored collector current of transistor 268 holding the base of transistor 274 high, and cutting it off, and also by the circuit made up of current sources 264 and 266. The current source 264 of typically 2 microamps on the base of transistor 267 is less current than the mirrored current (typically 10 microamps) from mirror transistor 263. Therefore transistor 267 is turned ON to hold the base of transistor 271 low when the enable input EN 252 is low. When the enable input EN 252 is high, and above the threshold voltage, then the current mirror 261 pulls the collector of transistor 260 high, and cuts off 262 and its mirror outputs 268 and 263. Transistor 267 is held off by the current source 264 to its base, and the current source 266 (typically 2 microamps) provides a starting current for the current loop stabilizer enabling all of the major current sources to operate the buffer.

In FIG. 9 the circuit shows the two voltage comparators which monitor the SA1 292 input and SA2 293 output pins on the buffer. Transistor 305 with current source 306 (typically 4 microamps) driving its emitter provides a balanced differential input with transistor 307 and current source 308 also 4 microamps. The base of transistor 307 is connected to a resistor divider providing the reference voltage for the operation threshold. The resistor 335 is connected to Vcc 290, and the other resistor 336 is connected to COM 291.

These two PNP transistors provide balanced drive to the long-tailed pair amplifier made up of emitter current source 304 (typically 32 microamps), and on one side NPN transistors 309 and 310 (which share their emitter current when they are conducting), and transistor 311.

A similar identical circuit made up of transistors and current sources 324 to 331 monitors SA2 293 also comparing this voltage with the reference.

Current sources 301, 302 and 303 monitor the output of the differential amplifier monitoring SA1 292, and provide three outputs 294, 295 and 296, in combination with three corresponding mirror circuits 321, 322, and 323 which operate under control of the SA2 293 voltage and its differential amplifier.

Output 294 is not active, and not pulled high, only when SA1 292 is low, below the reference threshold, and SA2 293 is higher than the reference threshold.

Output 295 is active and pulled high when SA1 292 is high.

Also output 296 is active and pulled high when SA1 292 is high.

On the other side output 297 is not active, and not pulled high, only when SA1 292 is high, and above the reference threshold, and SA2 293 is lower than the reference threshold.

Output 298 is active and pulled high when SA2 293 is high, as is also output 299.

Figure 10:
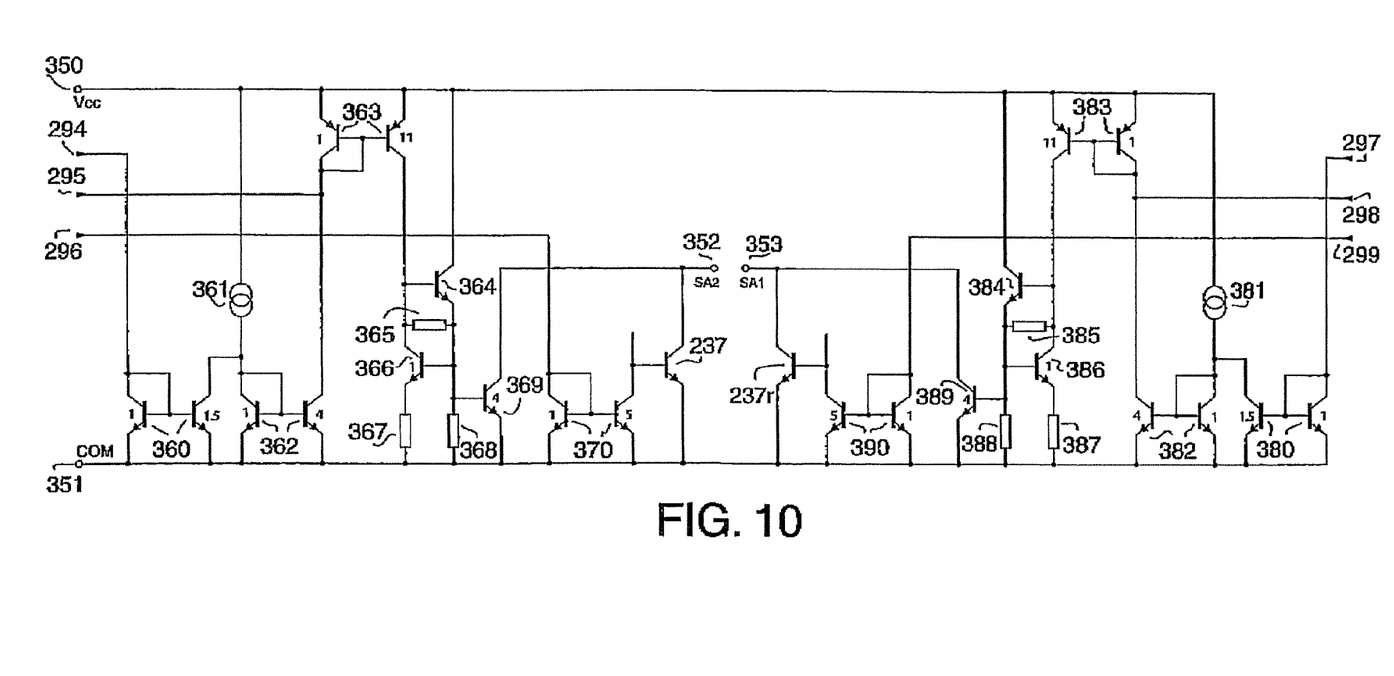
FIG. 10 shows an exemplary circuit of a current source interconnection that performs the boost pull-down circuits, and ensures that the output drive is effectively cut off when the input is high.

These six output signals in FIG. 9 are used to control the circuit shown in FIG. 10.

In FIG. 10, the outputs from FIG. 9, 294, 295 and 296, are used to control the buffer output SA2 352. Inputs 294 and 295 control the boost pull-down facility, and input 296 is used to ensure that the output transistor 237 driving SA2 352 is fully off when drive is not needed. This output transistor 237 is the main output drive transistor shown in FIG. 7. The additional base drive connections in FIG. 7 to transistors 237 and 237r are suggested by drawing a short not connected line on to these bases in FIG. 10.

When the signal 294 is high (that is a current source pulling 294 positive by about 10 microamps or more depending on whether SA1 is high, SA2 is low, or both), it provides drive to NPN current mirror 360 in order to hold the input to mirror 362 low, and hold its output off. Mirror 360 has an emitter area ratio of 1.5 times to ensure that when active, it is always capable of pulling down the output of current source 361. Therefore mirror 362 can only provide current output when 294 is off, and not pulled high: that is when SA1 is low (below the reference threshold) and SA2 is high, and above the reference threshold.

When 294 is low, the current source 361 of typically 8 microamps is mirrored in NPN current mirror 362 because the output transistor of this current mirror 362 has an emitter area four times that of the diode connected input transistor, it provides a drive current (typically 32 microamps) to PNP current mirror 363, which in turn by the emitter area ratio increases the current output by a further 11 times. That is to a typical current out of current mirror 363 of about 350 microamps.

When SA1 353 is high and greater than the threshold voltage, input 295 is pulled high, and is applied to the diode input of current mirror 363 to prevent leakage currents upsetting operation when the mirror is not driven. As this circuit is only active when SA1 is low, and input 294 on FIG. 10 is low, it prevents leakage currents upsetting the operation of the buffer when it is active as a voltage follower.

The output of current mirror 363 is applied to an amplifying current mirror circuit made up of transistors 364, 366 and 369. Transistor 364 is an emitter follower that drives the bases of transistors 366 and 369. Resistors 365 (typically 300 kilohms), and 368 (typically 10 kilohms) are to provide a path for leakage current when the drive current is off, ensuring that no unwanted amplified leakage currents can flow from the collector of transistor 369 while drive to this circuit is off.

The output transistor 369 has an emitter area 4 times larger than the current mirror input transistor 366. Therefore based on the emitter areas its output drive current will be four times greater than the drive current flowing from the current mirror 363. In addition a resistor 367 (typically 100 ohms) is included from the emitter of transistor 366 to COM 351, and for a drive current of 350 microamps from current mirror 366, this resistor 367 provides an additional 35 millivolts to the base voltage driving the output drive transistor 369. As is well known, this will increase the current out of transistor 369 by a factor of about three times, making the total output collector current about 0.350×3×4=4 milliamps.

Thus, when SA1 353 is pulled low, the buffer will not start to operate and pull SA2 352 down until SA1 353 has reached the operating threshold voltage. When SA1 353 reaches the threshold and SA2 352 is still high, this circuit will sink an additional pull down current of 4 milliamps to accelerate the fall time of SA2 352. This current will flow until SA2 352 reaches the operating threshold voltage, when at that point the boost pull down current is turned off, and SA2 352 begins to follow SA1 353 through the operation of the buffer follower amplifier circuit.

When input 296 on FIG. 10 is pulled high, that is, whenever SA1 353 is high, and greater than the operating threshold voltage, then an amplifying current mirror 370

(the emitter area ratio provides an output current 5 times larger), pulls down the base of the buffer output transistor 237 (this is the main buffer output transistor shown in the buffer circuit of FIG. 7). This holds the base low, preventing conduction in this output transistor 237, and prevents current flowing to pull SA2 352 low out of the buffer amplifier whenever the buffer input SA1 353 is above the operating threshold voltage.

This circuit is duplicated on the other side with inputs 297, 298 and 299 duplicating the control and boost pull down functions for the reverse buffer path. That is to provide boost pull down when SA1 353 is still high, and SA2 352 has been pulled below the operating threshold voltage.

In an embodiment of this invention it has been designed to be fully symmetrical between the two sides of the buffer. While it has been described as an interface between I2C or other bus systems with equal maximum allowable capacitive loading on each side of the buffer, it is not essential that it is designed to be symmetrical in this way, and limited to 400 pF on both sides of the buffer. It can be designed to offer a higher current drive capability on one side, and with this increased drive capability provide an opportunity to drive larger capacitance loads, permitting operation over greater distances. By using a second such buffer in series at the far end the maximum bus capacitance will return the maximum capacitance load it is capable of driving to below 400 pF, and in that way permit standard I2C and other bus driving ICs to be used at each end of the high capacitance bus.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A bus buffer
   including circuitry adapted to generate a logic high level on a first bi-directional signal path,
   one or more first stations connected to the first bi-directional signal path adapted to monitor a logic level on said first path, and to generate a logic low level on said first path;
   an interface device operatively coupled to the first bi-directional signal path, said interface device having a first receive input and a first transmit output; and
   circuitry adapted to generate a logic high level on a second bi-directional signal path; and
   one or more second stations connected to the second bi-directional signal path and adapted to monitor the logic level on said second path, and to generate a logic low level on said second path;
   the second bi-directional signal path being operatively connected to a second receive input and a second transmit output of the interface device, the interface device further including
   first electronic circuitry adapted to ensure that an output voltage on the second signal path follows an input voltage on the first signal path, interposing an offset voltage between said input and output voltages such that the voltage on the second signal path exceeds the voltage on the first signal path by the magnitude of said offset voltage; and
   second electronic circuitry adapted to ensure that an input voltage on the second signal path follows an output voltage on the first signal path, interposing an offset voltage between said input and output voltages such that the voltage on the first signal path exceeds the voltage on the second signal path by the magnitude of said offset voltage; and
   the first and second electronic circuitry further adapted such that when both the first and second signal paths are at an equal voltage, the interface device does not act to drive the first or the second signal path.

2. The buffer of claim 1 wherein when both the first and second signal paths are at an equal voltage, the drive by the interface device is non-zero, but is less that required to change the logic level of either signal path.

3. The buffer of claim 1 wherein the offset voltage between the input and output is of a magnitude which allows the use of said buffer in series with other said buffers.

4. The buffer of claim 1 wherein the offset voltage is between 0.05 and 0.15 volts.

5. The buffer of claim 1 wherein the offset voltage is 0.1 volts.

6. The buffer of claim 1 wherein the offset voltage is user definable.

7. The buffer of claim 1 wherein the buffer is adapted to include an operating threshold voltage, such that the buffering action begins when the input voltage falls below said threshold.

8. The buffer of claim 7 wherein the operating threshold voltage is between 20% and 40% of VCC.

9. The buffer of claim 7 wherein the operating threshold voltage is 30% of VCC.

10. The buffer of claim 7 wherein the operating threshold voltage is user definable.

11. The buffer of claim 7 wherein the operating threshold voltage of the inputs is different from that of the outputs.

12. The buffer of claim 7 wherein the buffer includes means to enable or disable the buffer such that when in the disabled state the buffer presents a low capacitance load to the busses on the input and output sides of the buffer.

13. The buffer of claim 7 wherein the buffer includes a boost pull-down current sink circuit which acts to pull down the output when the input is low and below the operating threshold voltage, while the output is greater than the operating threshold voltage.

14. The buffer of claim 13 wherein the boost pull down current is between 3 milliamps and 5 milliamps.

15. The buffer of claim 13 wherein the boost pull down current is 4 milliamps.

16. The buffer of claim 1 wherein the input or output terminals can be pulled high to a voltage above the supply rail.

17. The buffer of claim 1 wherein the operating power supply is between 2 volts and 5.5 volts, and the bus input and outputs are adapted to be pulled up to approximately 15 volts.

18. The buffer of claim 1 wherein the first and second bi-directional paths are identical, and interchangeable.

19. The buffer of claim 1 wherein the offset voltage for first and second bi-directional paths are dissimilar.

20. The buffer of claim 1 wherein the first and second bi-directional paths are physically separate.

21. The buffer of claim 1 implemented using a bipolar process.

22. The buffer of claim 1 adapted to operate at a speed capable of meeting the I2C specification.

* * * * *